US012632782B2

(12) United States Patent
Byrne et al.

(10) Patent No.: US 12,632,782 B2
(45) Date of Patent: May 19, 2026

(54) EFFICIENT MULTILABEL CLASSIFICATION BY CHAINING ORDERED CLASSIFIERS AND OPTIMIZING ON UNCORRELATED LABELS

(71) Applicant: Optum Services (Ireland) Limited, Dublin (IE)

(72) Inventors: Neill Michael Byrne, Dublin (IE); Kieran O'Donoghue, Dublin (IE); Michael J. McCarthy, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 930 days.

(21) Appl. No.: 17/805,742

(22) Filed: Jun. 7, 2022

(65) Prior Publication Data

US 2023/0394352 A1     Dec. 7, 2023

(51) Int. Cl.
    *G06N 20/00*       (2019.01)
    *G06F 18/2113*     (2023.01)
    (Continued)

(52) U.S. Cl.
    CPC ......... *G06N 20/00* (2019.01); *G06F 18/2113* (2023.01); *G06F 18/23213* (2023.01); *G06F 18/2411* (2023.01); *G06F 18/2431* (2023.01)

(58) Field of Classification Search
    CPC ... G06N 20/00; G06F 18/2411; G06F 18/241; G06F 18/24; G06F 18/23213; G06F 18/2321; G06F 18/232; G06F 18/23; G06F 18/2113; G06F 18/211; G06F 18/21; G06F 18/2431; G06F 18/243
    (Continued)

(56) References Cited

U.S. PATENT DOCUMENTS 7,725,329 B2    5/2010   Kil et al.
10,650,927 B2   5/2020   Are et al.
           (Continued)

FOREIGN PATENT DOCUMENTS

CN      110688482 A     1/2020
CN      111553127 A   *   8/2020   ............ G06F 40/117
           (Continued)

OTHER PUBLICATIONS

Gao et al., "A Three-phase Augmented Classifiers Chain Approach Based on Co-occurrence Analysis for Multi-Label Classification", ARXIV ID: 2204.06138, Apr. 12, 2022. (Year: 2022).*
           (Continued)

*Primary Examiner* — Hwei-Min Lu
(74) *Attorney, Agent, or Firm* — Alston & Bird LLP

(57) ABSTRACT

Various embodiments of the present invention provide methods, apparatus, systems, computing devices, computing entities, and/or the like for converting a multilabel classification model into a sequence of a plurality of binary classification models based on a plurality of label subgroups associated with the multilabel classification model, where the label subgroups comprise an optimal subgroup size, the optimal subgroup size is generated by optimizing an optimization measure defined by a subgroup size variable and a total inner group correlation measure, and identifying label membership to a particular subgroup by using a mixed integer linear program model.

20 Claims, 8 Drawing Sheets

(51) Int. Cl.
*G06F 18/23213* (2023.01)
*G06F 18/2411* (2023.01)
*G06F 18/2431* (2023.01)

(58) Field of Classification Search
USPC .......................................................... 706/12
See application file for complete search history.

(56) References Cited

U.S. PATENT DOCUMENTS

| | | | |
|---|---|---|---|
| 10,930,395 | B2 | 2/2021 | Mowery |
| 2011/0173018 | A1 | 7/2011 | Hoffner et al. |
| 2011/0302111 | A1* | 12/2011 | Chidlovskii ........... G06N 20/00 |
| | | | 706/46 |
| 2016/0350846 | A1 | 12/2016 | Dintenfass et al. |
| 2020/0118691 | A1 | 4/2020 | Kiljanek |
| 2020/0365268 | A1* | 11/2020 | Michuda ................ G16H 10/40 |
| 2021/0118571 | A1 | 4/2021 | Hsu et al. |
| 2022/0059224 | A1 | 2/2022 | Tulley et al. |
| 2022/0092338 | A1* | 3/2022 | Yang ...................... G06V 10/82 |

FOREIGN PATENT DOCUMENTS

| | | | | | |
|---|---|---|---|---|---|
| CN | 113989607 | A | * | 1/2022 | ........... G06F 18/211 |
| CN | 114298191 | A | * | 4/2022 | |
| WO | WO-2020095408 | A1 | * | 5/2020 | ........... G06F 16/285 |

OTHER PUBLICATIONS

Niaz et al., "Leveraging from group classification for video concept detection", 2013 11th International Workshop on Content-Based Multimedia Indexing (CBMI), Jun. 2013, pp. 173-178. (Year: 2013).*

Rokach et al., "Ensemble Methods for Multi-label Classification", ARXIV ID: 1307.1769, Jul. 6, 2013, pp. 1-32. (Year: 2013).*

Kommu et al., "A novel approach for multi-label classification using probabilistic classifiers", International Conference on Advances in Engineering & Technology Research (ICAETR—2014), Aug. 2014, pp. 1-8. (Year: 2014).*

Huang et al., "Group sensitive Classifier Chains for multi-label classification", 2015 IEEE International Conference on Multimedia and Expo (ICME), Jun. 2015, pp. 1-6. (Year: 2015).*

Rastin et al, "Multi-label classification systems by the use of supervised clustering", 2017 Artificial Intelligence and Signal Processing Conference (AISP), Oct. 2017, pp. 246-249. (Year: 2017).*

Biswas et al., "Parallelization of Multi-label classification for large data sets", 2018 IEEE Symposium Series on Computational Intelligence (SSCI), Nov. 2018, pp. 2005-2010. (Year: 2018).*

Bidgoli et al., "A Novel Multi-objective Binary Differential Evolution Algorithm for Multi-label Feature Selection", 2019 IEEE Congress on Evolutionary Computation (CEC), Jun. 10-13, 2019, pp. 1588-1595. (Year: 2019).*

Weng et al., "An Efficient Stacking Model of Multi-Label Classification Based on Pareto Optimum", IEEE Access, vol. 7, Jul. 26, 2019, pp. 127427-127437. (Year: 2019).*

Zhang et al., "Multi-Label Feature Selection Based on High-Order Label Correlation Assumption", Entropy, 22(7), 797, Jul. 21, 2020, pp. 1-24. (Year: 2020).*

Jiaman et al., "Association Rules-Based Classifier Chains Method", IEEE Access, vol. 10, Feb. 4, 2022, pp. 18210-18221. (Year: 2022).*

Gao et al., "A Three-phase Augmented Classifiers Chain Approach Based on Co-occurrence Analysis for Multi-Label Classification", ARXIV ID: 2204.06138, Apr. 12, 2022, pp. 1-24. (Year: 2022).*

Fissler, Tobias et al. "Model Comparison and Calibration Assessment," arXiv PrePrint arXiv:2202.12780v1 [stat.ML], Feb. 25, 2022, pp. 1-68.

Fu, Bin. "Learning Label Dependency for Multi-Label Classification," Doctoral Dissertation, Faculty of Engineering and Information Technology, University of Technology, Sydney, Feb. 2018, (158 pages).

Luo, Li et al. "Using Machine Learning Approaches to Predict High-Cost Chronic Obstructive Pulmonary Disease Patients in China," Health Informatics Journal, vol. 26, No. 3, Sep. 2020, pp. 1577-1598, DOI: 10.1177/1460458219881335.

Wang, Zhenwu et al. "Partial Classifier Chains with Feature Selection by Exploiting Label Correlation in Multi-Label Classification," Entropy, vol. 22, No. 10:1143, pp. 1-22, Oct. 10, 2020, DOI: 10.3390/e22101143.

\* cited by examiner

Identify a prediction input data object
402

Generate classification scores
404

Perform prediction-based actions
406

800

ICD10 I11.0 – Hypertensive heart disease with heart failure
HCC85 - Congestive Heart Failure
Score: 0.92   Lift: 6.78   Prevalence: 0.15
Supp Note Name: SN-3430771

Related Predictions

| |
|---|
| I509.9 – Heart failure, unspecified |
| I13.0 – Hypertensive heart and chronic kidney disease with heart failure |
| E26.1 – Secondary hyperaldosteronism |
| E11.22 – Type 2 diabetes mellitus with diabetic chronic kidney disease TEXT_ckd |

EFFICIENT MULTILABEL CLASSIFICATION BY CHAINING ORDERED CLASSIFIERS AND OPTIMIZING ON UNCORRELATED LABELS

BACKGROUND

Various embodiments of the present disclosure address technical challenges related to performing predictive data analysis and provide solutions to address the efficiency and reliability shortcomings of existing predictive data analysis solutions.

BRIEF SUMMARY

In general, various embodiments of the present disclosure provide methods, apparatus, systems, computing devices, computing entities, and/or the like for converting a multi-label classification model into a sequence of a plurality of binary classification models based on a plurality of label subgroups associated with the multilabel classification model, where the label subgroups comprise an optimal subgroup size, the optimal subgroup size is generated by optimizing an optimization measure defined by a subgroup size variable and a total inner group correlation measure, and identifying label membership to a particular subgroup by using a mixed integer linear program model.

In accordance with one aspect, a method is provided. In one embodiment, the method comprises: receiving, by a computing device, a prediction input data object associated with classifications labels assigned to a plurality of label groups; generating, by the computing device, using the multi-label classification machine learning model, and based on the prediction input data object, classification scores for the classification labels, wherein: the multi-label classification machine learning model is characterized by a sequence of classifier groups, the sequence of classifier groups including an initial classifier group and one or more non-initial classifier groups, the initial classifier group is characterized by an initial per-label classifier set associated with an initial label group selected from the plurality of label groups, a given one of the one or more non-initial classifier groups is characterized by a subsequent per-label classifier set associated with a subsequent label group selected from the plurality of label groups and one or more preceding per-label classifier sets from one or more preceding classifier groups, including the initial label group, in the sequence of classifier groups, and generating the plurality of label groups comprises, during training of the multi-label classification machine learning model: receiving a training dataset associated with the plurality of label groups; generating correlation values representative of co-occurrence frequency between a plurality of classification labels, wherein each correlation value comprises a co-occurrence frequency measure for a classification label pair as determined based on the training dataset; and generating, based on the correlation values, the plurality of label groups, each label group including a grouped subset of the plurality of label groups, and the grouped subset having an inner group correlation measure that satisfies one or more inner group correlation measure conditions; and performing, by the computing device, one or more prediction-based actions based on the classification scores.

In accordance with another aspect, an apparatus comprising at least one processor and at least one memory including computer program code is provided. In one embodiment, the at least one memory and the computer program code may be configured to, with the processor, cause the apparatus to: receive a prediction input data object associated with classifications labels assigned to a plurality of label groups; generate, using the multi-label classification machine learning model, and based on the prediction input data object, classification scores for the classification labels, wherein: the multi-label classification machine learning model is characterized by a sequence of classifier groups, the sequence of classifier groups including an initial classifier group and one or more non-initial classifier groups, the initial classifier group is characterized by an initial per-label classifier set associated with an initial label group selected from the plurality of label groups, a given one of the one or more non-initial classifier groups is characterized by a subsequent per-label classifier set associated with a subsequent label group selected from the plurality of label groups and one or more preceding per-label classifier sets from one or more preceding classifier groups, including the initial label group, in the sequence of classifier groups, and generate the plurality of label groups during training of the multi-label classification machine learning model by: receiving a training dataset associated with the plurality of label groups; generating correlation values representative of co-occurrence frequency between a plurality of classification labels, wherein each correlation value comprises a co-occurrence frequency measure for a classification label pair as determined based on the training dataset; and generating, based on the correlation values, the plurality of label groups, each label group including a grouped subset of the plurality of label groups, and the grouped subset having an inner group correlation measure that satisfies one or more inner group correlation measure conditions; and perform one or more prediction-based actions based on the classification scores.

In accordance with yet another aspect, a computer program product is provided. The computer program product may comprise at least one computer-readable storage medium having computer-readable program code portions stored therein, the computer-readable program code portions comprising executable portions configured to: receive a prediction input data object associated with classifications labels assigned to a plurality of label groups; generate, using the multi-label classification machine learning model, and based on the prediction input data object, classification scores for the classification labels, wherein: the multi-label classification machine learning model is characterized by a sequence of classifier groups, the sequence of classifier groups including an initial classifier group and one or more non-initial classifier groups, the initial classifier group is characterized by an initial per-label classifier set associated with an initial label group selected from the plurality of label groups, a given one of the one or more non-initial classifier groups is characterized by a subsequent per-label classifier set associated with a subsequent label group selected from the plurality of label groups and one or more preceding per-label classifier sets from one or more preceding classifier groups, including the initial label group, in the sequence of classifier groups, and generate the plurality of label groups during training of the multi-label classification machine learning model by receiving a training dataset associated with the plurality of label groups; generating correlation values representative of co-occurrence frequency between a plurality of classification labels, wherein each correlation value comprises a co-occurrence frequency measure for a classification label pair as determined based on the training dataset; and generating, based on the correlation values, the plurality of label groups, each label group including a grouped subset of the plurality of label groups, and the grouped subset having an inner group correlation measure that satisfies one or more inner group correlation measure conditions; and perform one or more prediction-based actions based on the classification scores.

BRIEF DESCRIPTION OF THE DRAWINGS

Figure 1:
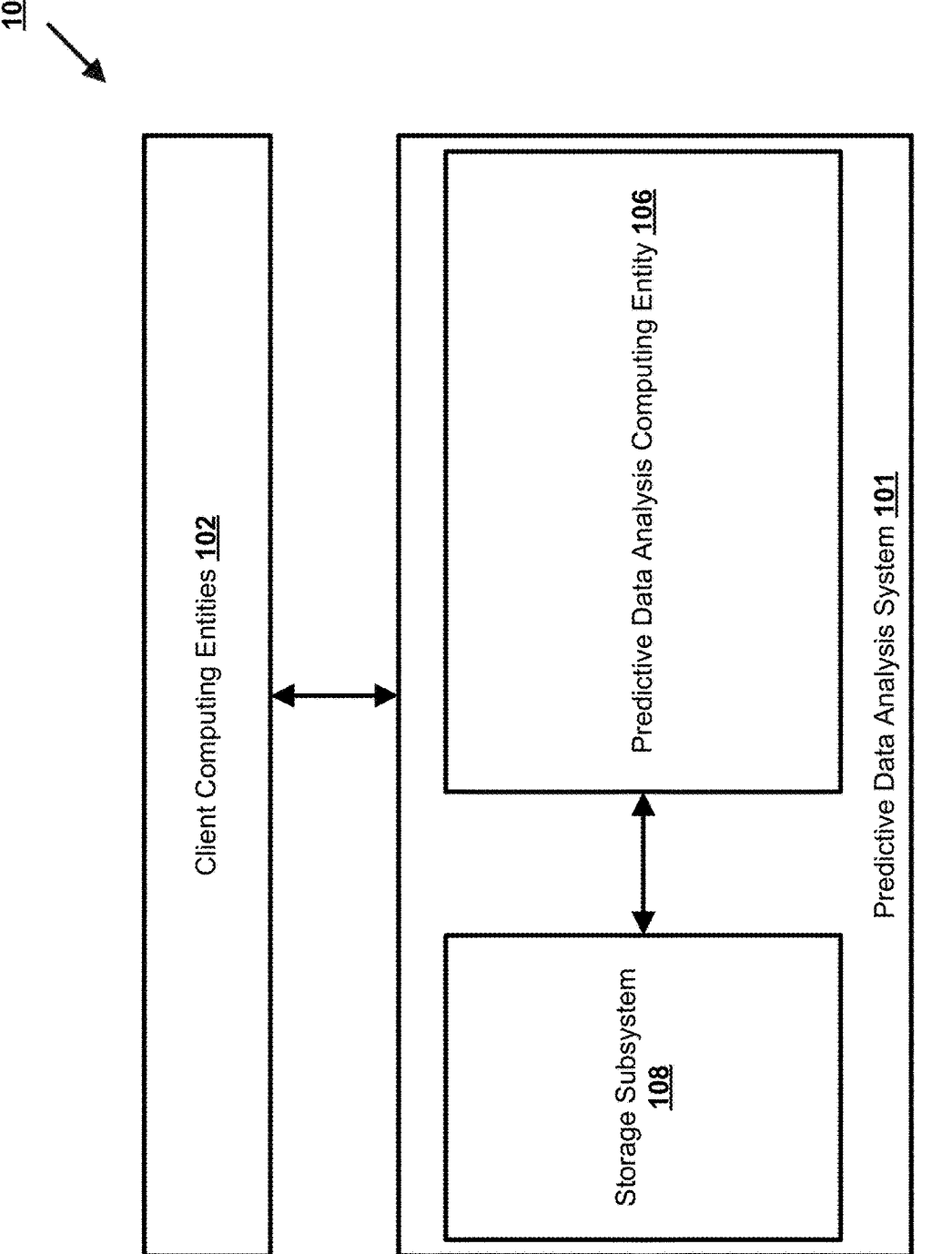

Having thus described the disclosure in general terms, reference will now be made to the accompanying drawings, which are not necessarily drawn to scale, and wherein:

FIG. 1 provides an exemplary overview of an architecture that can be used to practice embodiments of the present disclosure.

Figure 2:
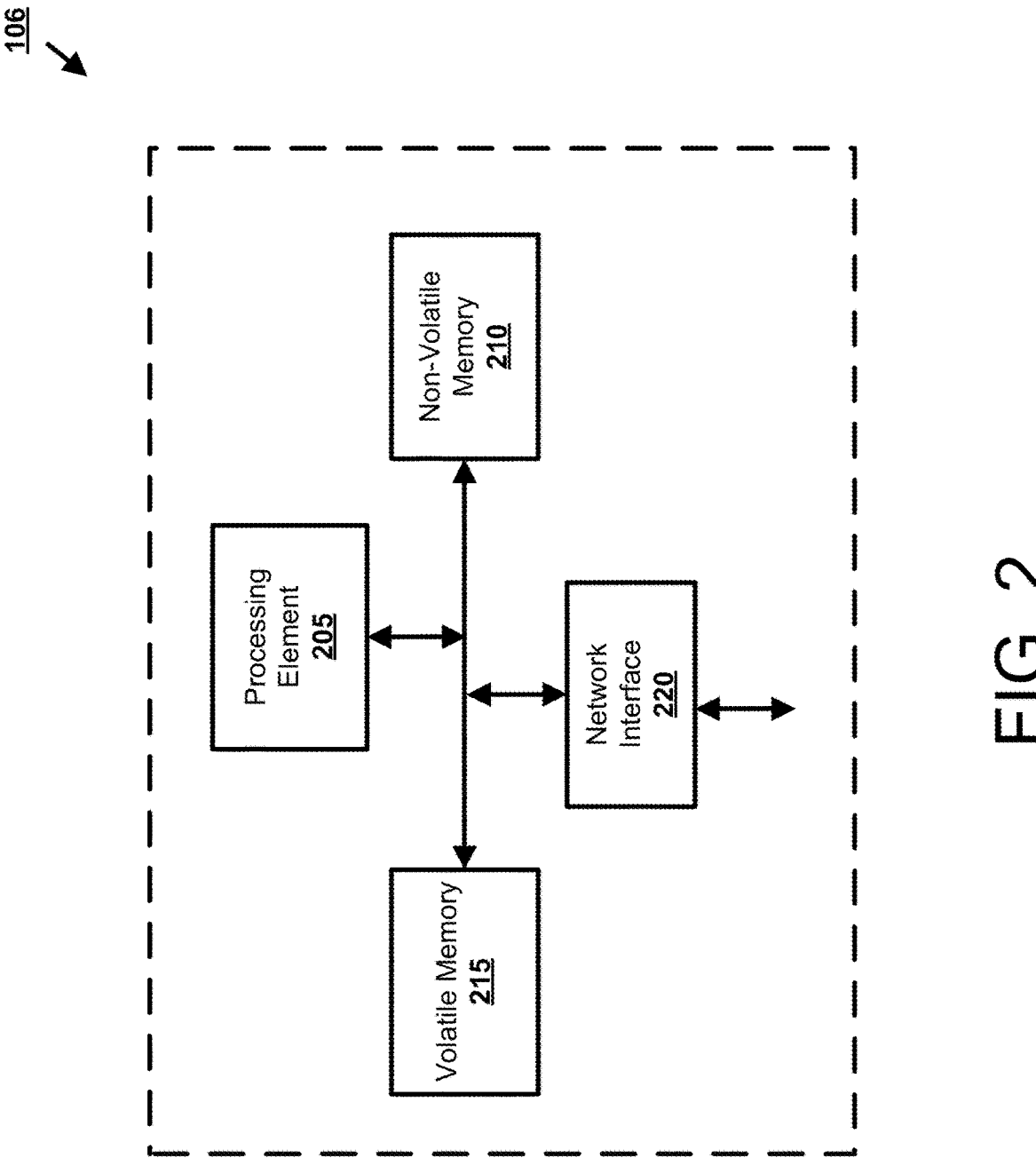

FIG. 2 provides an example predictive data analysis computing entity in accordance with some embodiments discussed herein.

Figure 3:
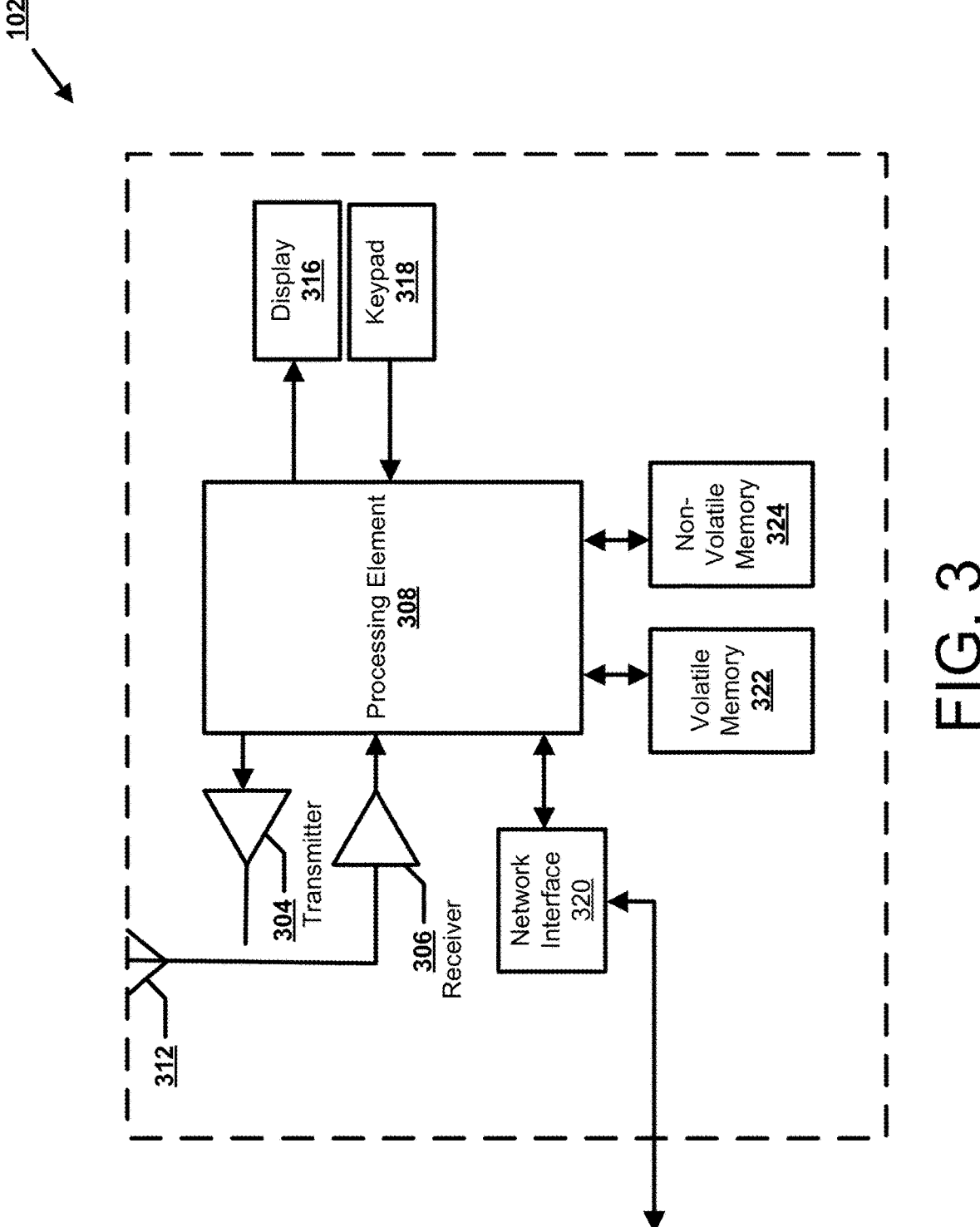

FIG. 3 provides an example client computing entity in accordance with some embodiments discussed herein.

Figure 4:
Figure 4:
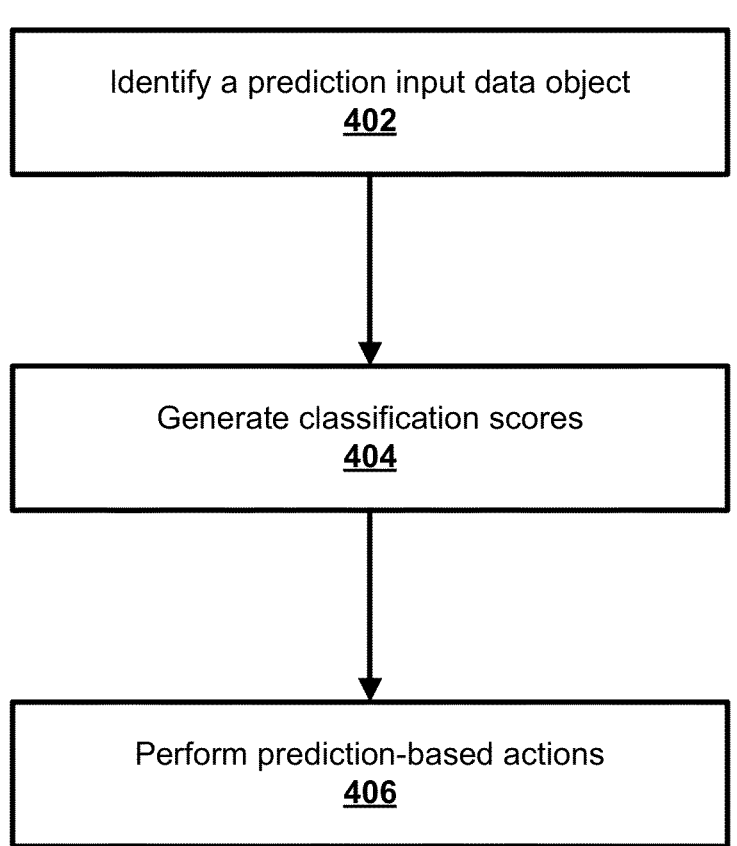

FIG. 4 presents a flowchart diagram of an example process for performing multi-label classification operations on a prediction input data object in accordance with some embodiments discussed herein.

Figure 5:
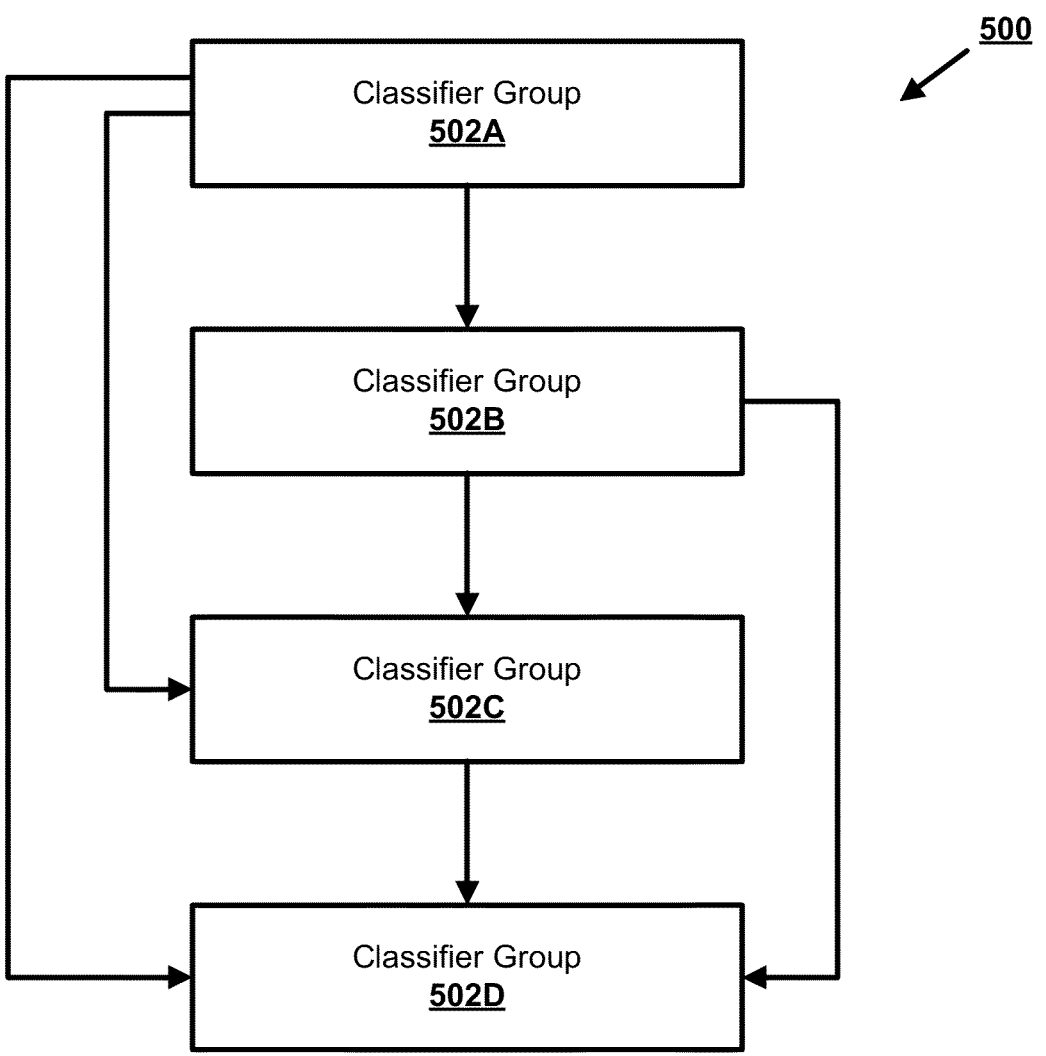

FIG. 5 provides an exemplary architecture for a sequence of classifier groups in accordance with some embodiments discussed herein.

Figure 6:
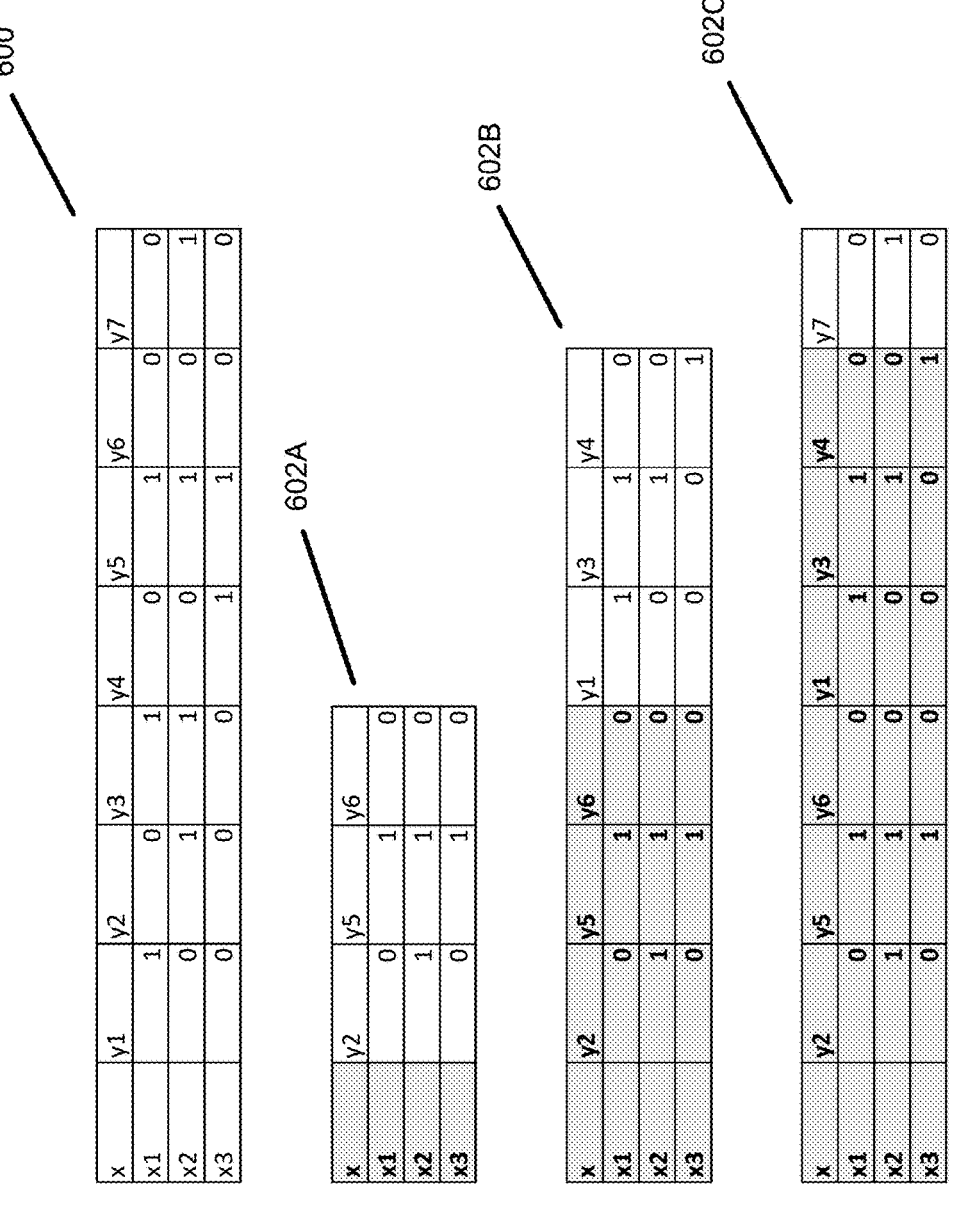

FIG. 6 provides an exemplary transformation of a training dataset for application in a sequence of classifier groups in accordance with some embodiments discussed herein.

Figure 7:
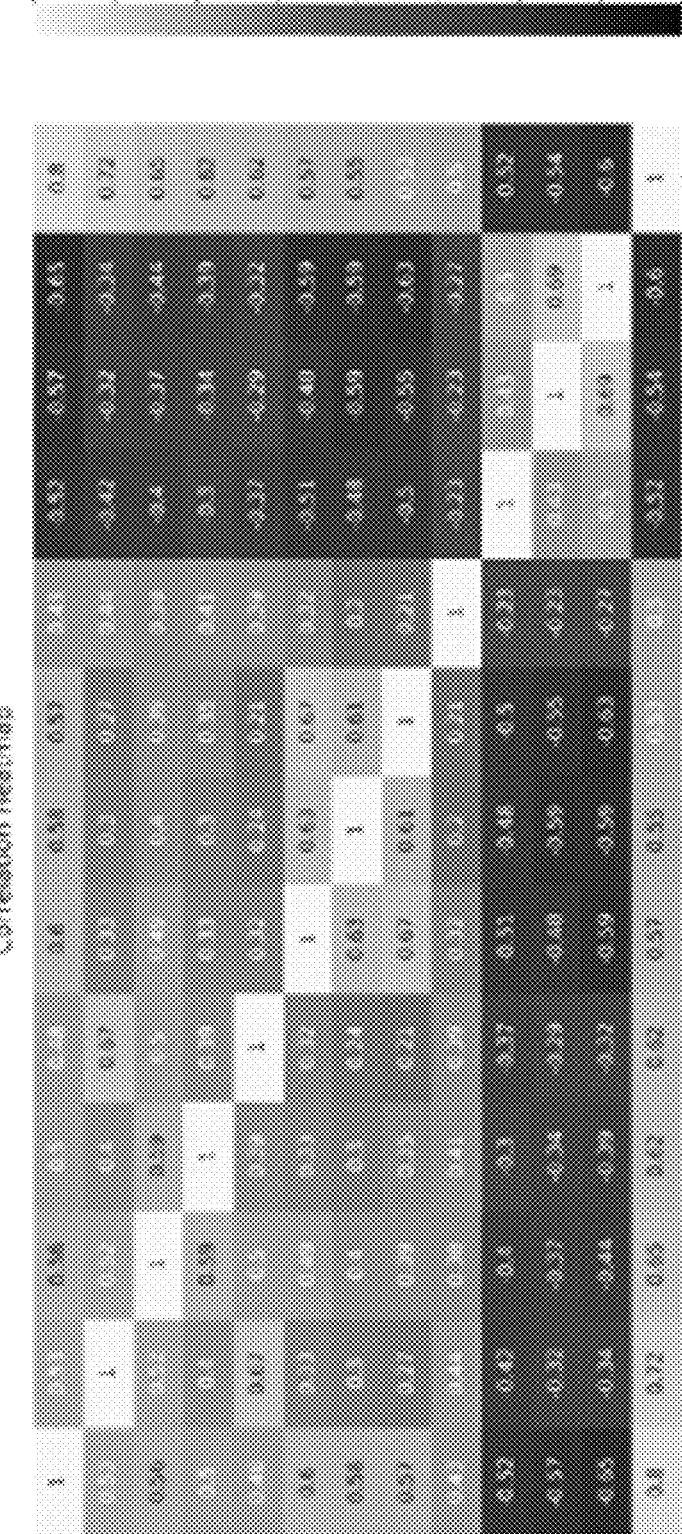

FIG. 7 provides an exemplary heatmap of correlation between classification labels in accordance with some embodiments discussed herein.

Figure 8:
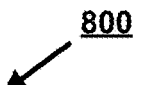

FIG. 8 provides an operational example of a prediction output user interface in accordance with some embodiments discussed herein.

DETAILED DESCRIPTION

Various embodiments of the present disclosure now will be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to predictive data analysis, one of ordinary skill in the art will recognize that the disclosed concepts can be used to perform other types of data analysis.

I. OVERVIEW AND TECHNICAL IMPROVEMENTS

Various embodiments of the present disclosure make important technical contributions to improving computational efficiency of generating multi-label classifications for prediction input data objects that are associated with a large number of predictive labels. A common challenge in machine learning is the ability to perform multi-label prediction on a large volume of classification labels. This is made difficult by the fact that many machine learning systems and techniques are designed for either binary or multi-label classification. Hence in order to solve these problems, typically some type of transformation is required.

Examples of such transformations include binary relevance, label powerset, and classifier chains. Binary relevance may involve creating n individual classifier, one for each label 0, 1, 2, 3, . . . , n, transforming the multi-label problem to multiple binary classification problems. The advantage of this is that it places no limitation on the choice of algorithm, however it fails to take advantage of any information sharing within a label-set as all classifiers are independent. Label powerset includes finding all unique combinations of n labels and categorizes them with a unique alternate label, which converts the problem into a multiclass classifier. The main disadvantage of this method is that as the problem set grows, both independent data and number of labels-sets in the data, the number of assigned labels also grows quite quickly. It can also be difficult to source the quality (or lack thereof) of results for any label back to a single attributable classifier. Also given that each unique label-set is predefined, this method does not generalize well if there are unseen unique label combinations in the training dataset.

Classifier chains transformation is similar to binary relevance with the exception that it builds a sequence of binary classifiers and the prior label predictions form part of the training input data object for the subsequent classifier. This takes advantage of information in part of the label-set when predicting the balance of the labels. However, the order of classifiers within a chain can be an important factor on accuracy. That is, the result of a classifier chain can vary for different order of chains. Thus, the sequence of the chain of classifiers may be considered as an optimizable hyperparameter, particularly in training a model comprising classifier chains to maximize the uni-directional information transfer of label-set data. For a relatively small set of labels, this is typically not a problem as one can brute-force grid search over all possible sequence permutations, however as the unique number of labels increases this can soon become very computationally expensive. Accordingly, techniques that improve the overall performance of a chain of classifiers, such as techniques described herein, enable solving of machine learning problems that have large classification label spaces with many correlated relationships. In doing so, the techniques described herein improve accuracy, efficiency, and speed of multi-label classification machine learning models, thus reducing the number of computational operations needed and/or the amount of training data entries needed to multi-label classification machine learning models. Accordingly, the techniques described herein improve at least one of the computational efficiency, storage-wise efficiency, and speed of training multi-label classification machine learning models.

For example, various embodiments of the present disclosure improve accuracy of multi-label classification machine learning models by using classifier chains that leverage the co-occurrence or correlations of a label-set. One of the most challenging tasks in multi-label classification is to identify label interdependence. As described herein, the usage of classifier chains is an effective method that utilizes label interdependence for improving classification accuracy. In some embodiments, classifier chains involve building a sequence of classifiers where prior label predictions form part of a training input data object for a subsequent classifier in the chain of classifiers. A disadvantage of the manner in which classifier chains are generated is that the order of the individual label classifiers within a classifier chain can affect prediction accuracy. Furthermore, finding an optimal sequence of classifiers within the classifier chain may require searching over all possible classifier sequence permutations.

However, in accordance with various embodiments of the present disclosure, each classification label for a classifier chain may be assigned to a particular group whereby the within-group correlation is minimal. As such, highly correlated labels may be distributed into different groups so that information from the correlations are less likely to be loss. This technique will lead to higher accuracy of performing multi-label classification using classifier chains with large label-sets. In doing so, the techniques described herein improving efficiency and speed of training multi-label classification machine learning models, thus reducing the number of computational operations needed and/or the amount of training data entries needed to train multi-label classification machine learning models. Accordingly, the techniques described herein improve at least one of the computational efficiency, storage-wise efficiency, and speed of training multi-label classification machine learning models.

An exemplary application of various embodiments of the present disclosure relates to generating classifications or representations corresponding to various medical codes of a medical data record. In some embodiments, a multi-label classification model processes a label-set corresponding to the various medical codes with correlations between the labels to consider for classification of the label-set. In an illustrative example, given a medical data record associated with a patient or a patient's visit to a healthcare provider, various embodiments of the present disclosure are directed to predicting which of a plurality of codes are associated with the medical data record and representative of a prediction outcome. Various embodiments of the present disclosure may predict disease codes in a medical document or generate a healthcare prediction based on diagnosis codes from medical visitation history. A key benefit of various embodiments of the present disclosure is improved characterization of a label-set in a healthcare setting where medical codes are not mutually exclusive and predictions of probabilities of multiple outcomes are desired.

Various embodiments of the present disclosure are directed to multi-label classification using a multi-label classification machine learning model. In some embodiments, the multi-label classification machine learning model comprises a sequence of classifier groups. The sequence of classifier groups may include an initial classifier group and one or more non-initial classifier groups. The initial classifier group may be characterized by an initial per-label classifier set associated with an initial label group selected from a plurality of label groups. A given one of the one or more non-initial classifier groups may be characterized by a subsequent per-label classifier set associated with a subsequent label group selected from the plurality of label groups and one or more preceding per-label classifier sets from one or more preceding classifier groups, including the initial label group, in the sequence of classifier groups.

In accordance with various embodiments of the present disclosure, generating the plurality of label groups comprises receiving a training dataset associated with the plurality of label groups and generating correlation values representative of co-occurrence frequency between a plurality of classification labels, wherein each correlation value comprises a co-occurrence frequency measure for a classification label pair as determined based on the training dataset. The plurality of label groups may be generated based on the correlation values where each label group includes a grouped subset of the plurality of label groups, and the grouped subset includes an inner group correlation measure that satisfies one or more inner group correlation measure conditions.

Moreover, various embodiments of the present disclosure make important technical contributions to improving resource-usage efficiency of post-prediction systems by using classifier chains that leverage the co-occurrence or correlations of a label-set to minimize the computational effort of processing on large multi-label label-sets. For example, in some embodiments, a predictive data analysis computing entity determines L per-label classifications for L label groups of a prediction input data object based at least in part on the label-set representation for the L label groups. Then, the count of label groups that are associated with affirmative per-label classifications, along with a resource utilization ratio for each label group, can be used to predict a predicted number of computing entities needed to perform post-prediction processing operations (e.g., automated investigation operations) with respect to the L label groups. For example, in some embodiments, the number of computing entities needed to perform post-prediction processing operations (e.g., automated investigation operations) with respect to the L label groups can be determined based at least in part on the output of the equation:

$$R = \text{ceil}\left(\sum_{k}^{k=K} ur_k\right),$$

where R is the predicted number of computing entities needed to perform post-prediction processing operations with respect to the L label groups, ceil(·) is a ceiling function that returns the closest integer that is greater than or equal to the value provided as the input parameter of the ceiling function, k is an index variable that iterates over K label groups among the L label groups that are associated with affirmative investigative classifications, and $ur_k$ is the estimated resource utilization ratio for a kth label group that may be determined based at least in part on a size associated with the kth label group. In some embodiments, once R is generated, the predictive data analysis computing entity can use R to perform operational load balancing for a server system that is configured to perform post-prediction processing operations (e.g., automated investigation operations) with respect to the L label groups. This may be done by allocating computing entities to the post-prediction processing operations if the number of currently-allocated computing entities is below R, and deallocating currently-allocated computing entities if the number of currently-allocated computing entities is above R.

II. DEFINITIONS

The term "prediction input data object" may refer to a data construct that describes a prediction of a machine learning model, such as a classifier. The prediction may comprise a prediction set comprising a classification output based on a given data input. A classification output may include one or more classification labels. As an example, in some embodiments, the classification labels may comprise medical codes, e.g., International Statistical Classification of codes, prescription (RX) codes that are generated as classification output for prediction electronic medical records data.

The term "classification label" may refer to a data construct that describes a label that associates target features, properties, or characteristics to a training input data object, such as images, text files, audio/video files, and application files that may be used to, for example, train a machine learning model. The information labels may comprise descriptions, tags, or identifiers that classify or emphasize features present in training input data object which may be analyzed by machine learning models for patterns to perform a predictive inference. A training input data object may be generated by, for example, a combination of automation software, artificial intelligence, and human input. For example, in some embodiments, training input data objects in the healthcare domain may comprise medical codes, e.g., ICD codes, CPT codes, and RX codes.

The term "label group" may refer to a data construct that describes sets of one or more classification labels. For example, the one or more classification labels may be assigned from a label-set comprising a universal set of classification labels to a respective label group. According to one embodiment, the universal set of classification labels may comprise a prediction input data object. According to another embodiment, classification labels may be distributed into certain label groups based on correlation, or minimal correlation. For example, a given group of labels may include one or more classification labels, where each classification label within the given group of labels has a minimal correlation with other ones of classification labels within the given group of labels. Minimal correlation of the classification labels may be determined by generating correlation values representative of co-occurrence frequency or covariance between a plurality of classification labels. The correlation values may comprise a co-occurrence frequency or covariance measure for a classification label pair as determined based on a training dataset. According to another embodiment, classification labels may be assigned to each group of labels such that the sum of the absolute sum of correlations within each group is minimized.

The term "classifier" may refer to a data construct that describes hyperparameters, and/or defined operations of a machine learning model, where the machine learning model is trained with training input data objects including classifications labels, and the machine learning model is configured to process a prediction input data object to generate a predictive inference that describes a selected label for the prediction input data object. For example, a classifier may generate a predictive inference associated with ICD codes based on data from a medical visit data record. As another example, a classifier may generate a predictive inference based on CPT codes associated with a medical service data record. As a further example, the classifier may generate a predictive inference based on RX codes associated with a prescription data record.

The term "classifier group" may refer to a data construct that describes a set of one or more classifiers. Each of the classifiers may be associated with a respective classification label from a given label group. For example, a given classifier group may comprise n independent classifiers corresponding to respective n classification labels of a given label group.

The term "co-occurrence frequency" may refer to a data construct that describes a strength of relationship between two variables. In some embodiments, the relationship may comprise a semantic proximity of the two variables. For example, co-occurrence frequency may comprise an above-chance frequency of phrases associated with two given classification labels coinciding or existing within a structure of text.

The term "co-occurrence frequency measure" may refer to a data construct that describes a value corresponding to a measurement of co-occurrence frequency. The measurement of co-occurrence frequency may comprise correlation values that are calculated for a classification label pair.

The term "correlation values" may refer to a data construct that describes a statistical measure of a strength of a relationship between two variables. In one embodiment, correlation values may be representative of co-occurrence frequency between a plurality of classification labels, wherein each correlation value comprises a co-occurrence frequency measure for a classification label pair. In another embodiment, correlation values may comprise a Pearson correlation coefficient between two given classification labels, where a scale from −1 (e.g., perfectly negatively correlated) to +1 (e.g., perfectly positive correlated) may be assigned to given classification label pairs. In a further embodiment, the correlation values may comprise a relative spatial distance between the classification labels. Other examples of correlation values that may be used include Sorensen—Dice coefficients, Hamming distance, Jaccard similarity coefficient, and Kulsinski dissimilarity. Correlation values may be used to generate a plurality of label groups, where each label group includes a grouped subset of the plurality of label groups that are minimally correlated in accordance with the correlation values.

The term "inner group correlation measure" may refer to a data construct that describes a correlation value between a classification label within a particular group of labels and another classification label within the same particular group of labels. In some embodiments, classification labels of the label-set may be assigned to each group of labels such that the sum of the absolute sum of correlations within each group is minimized. This may be accomplished by, for example, iteratively assigning a given classification label with a highest total absolute correlation summation measure to all other classification labels to a given one of a plurality of label groups with a resulting lowest inner group correlation measure. This process may be repeat until all classification labels of the label-set have been assigned. In some embodiments, total absolute correlation summation measure describes a summation of correlation values for all labels within a group of labels.

The term "total absolute correlation summation measure" may refer to a data construct that describes a summation of correlation values for all labels within a group of labels. According to one embodiment, for each classification label within a label group, a total absolute correlation summation measure is generated based on each correlation value that is associated with the classification label with respect to other classification labels within the same label group.

The term "group count selection relationship" may refer to a data construct that describes a correlation between a quantity of label groups and corresponding total inner group correlation measures of the label groups. For example, the quantity of label groups may be inversely correlated with total inner group correlation measures of the label groups. Lower total inner group correlation measures may correspond to more accurate prediction while higher quantity of label groups may correspond to higher computing costs. According to one embodiment, the group count selection relationship may be used to calculate the size of the label groups such to determine an optimal or desired trade-off which minimizes the total inner group correlation measures and the quantity of label groups. In one example, total inner group correlation measures may be constrained by the quantity of label groups, where the quantity of label groups may be directly correlated with computing power. As such, given a limit of computational resources, total inner group correlation measures may be determined based on a largest number of label groups allowed by the limit of computational resources.

The term "mixed integer linear program machine learning model" may refer to a data construct that describes parameters, hyperparameters, and/or defined operations of a machine learning model that is configured to determine an optimal or desired outcome in accordance with a relationship (e.g., a mathematical relationship) where an objective and one or more constraints may be expressed as a system of linear equations. As an example, a mixed integer linear program machine learning model may be configured to group classification labels into a given quantity of label groups with given total inner group correlation measures.

The term "group inclusion indicators" may refer to a data construct that describes a value identifying whether a given classification label is assigned to a particular label group. For example, a group inclusion indicator may comprise a binary indicator [0, 1] to identify whether a classification label belongs to a given label group. In one embodiment, a mixed integer linear program machine learning model is configured to generate group inclusion indicators associated with a given one of a plurality of label group for each classification label of a label-set such that the total absolute correlation summation measure within each of the plurality of label groups is minimized.

The term "sequence of classifier groups" may refer to a data construct that describes an ordered series of classifier groups. The sequence of classifier groups may be characterized by a cumulation of predictive inferences generated by each classifier group in the ordered series. For example, an initial classifier group in the sequence of classifier groups may be generated by selecting an initial group of classification labels from a plurality of label groups and building an independent classifier for each label in the initial group of classification labels. In a further example, a subsequent classifier group after the initial classifier group in the sequence of classifier groups may generated by selecting a subsequent group of classification labels from the plurality of label groups and building an independent classifier for each label in the subsequent group of classification labels in addition to using one or more predictive inferences generated by the initial classifier group as a feature set in the subsequent classifier group. The process described for the subsequent classifier group may be repeated for each successive classifier group generated in the sequence of classifier groups. As such, each subsequent classifier group in the ordered series may build upon prior label predictions in the form of a training input data object for the subsequent model.

The term "multi-label classification" may refer to a data construct that describes the prediction output of a predictive inference performed with respect to a plurality of classifier groups based at least in part on a set of classification labels associated with a prediction input data object. For example, the predictive inference may comprise a classification of the prediction input data object based on multiple non-exclusive classification labels. The prediction input data object may include a plurality of data features that may be associated with a plurality of predefined classification labels. As another example, a multi-label classification for a predictive input data object corresponding to a medical visit data record may describe one or more ICD, CPT, or RX codes.

The term "multi-label classification machine learning model" may refer to a data construct that describes parameters, hyperparameters, and/or defined operations of a machine learning model that is configured to process a prediction input data object to generate a multi-label classification for the prediction input data object. As described above, given a prediction input data object, the multi-label classification machine learning model may comprise a sequence of classifier groups configured to process the prediction input data object to generate a predictive inference. The predictive inference may comprise a classification of the prediction input data object based on multiple non-exclusive classification labels. The predictive inference may be used by a computing device to perform one or more prediction-based actions. The multi-label classification machine learning model may be applied to any classification task that includes a large classification label space, especially in situations where the classification label space comprises many correlated relationships. Some examples, in the healthcare space, include but are not limited to, automated ICD coding prediction within medical records and predicting future propensity to a variety of diseases, or admissions to various healthcare settings. In an example, the multi-label classification machine learning model may analyze medical diagnosis data records associated with members of a health care plan and identify potential undocumented conditions to a medical decision aid system.

The term "multi-dimensional clustering space" may refer to a data construct that describes a collection of a plurality of elements where each of the plurality of elements may be selected for grouping into element groups. In an example, a label group is generated by generating a mapping of classification labels within a label-set. According to one embodiment, the classification labels may be the mapped based on minimum correlation values among the classification labels.

The term "label clusters" may refer to a data construct that describes a grouping of labels that are grouped in accordance with a clustering-based technique for grouping classification labels into label groups. For example, k-means clustering may be performed on a label-set, creating k number of label clusters. In one embodiment, the k-means clustering may assign classification labels to labels groups by minimizing an expectation-maximization function. According to an alternative embodiment, the expectation-maximization function is maximized so that the sum of the squared distances is at its most in each label group.

III. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DEVIM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is a request for generating a reason for visit for a medical visit.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3

SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi®), Wi-Fi® Direct, 802.16 (WiMAX®), ultra-wideband (UWB), infrared (IR) protocols, near field communication (NFC) protocols, Wibree, Bluetooth® protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Exemplary Client Computing Entity

FIG. 3 provides an illustrative schematic representative of a client computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi®, Wi-Fi® Direct, WiMAX®, UWB, IR, NFC, Bluetooth®, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi® access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi® access points, cellular towers, nearby computing devices (e.g., smartphones, laptops) and/or the like. For instance, such technologies may include the iBeacons, Gimbal proximity beacons, Bluetooth® Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present disclosure improve computational efficiency of generating multi-label classifications for prediction input data objects that are associated with a large number of predictive labels by disclosing techniques that identify an optimal label sequence (or near optimal sequence given some constraint) for a machine learning model comprising a chain of classifiers. A common challenge in machine learning is the ability to perform multi-label prediction on a large volume of classification labels. This is made difficult by the fact that many machine learning systems and techniques are designed for either binary or multi-label classification. Hence in order to solve these problems, typically some type of transformation is required.

Examples of such transformations include binary relevance, label powerset, and classifier chains. Binary relevance may involve creating n individual classifier, one for each label 0, 1, 2, 3, . . . , n, transforming the multi-label problem to multiple binary classification problems. The advantage of this is that it places no limitation on the choice of algorithm, however it fails to take advantage of any information sharing within a label-set as all classifiers are independent. Label powerset includes finding all unique combinations of n labels and categorizes them with a unique alternate label, which converts the problem into a multi-class classifier. The main disadvantage of this method is that as the problem set grows, both independent data and number of labels-sets in the data, the number of assigned labels also grows quite quickly. It can also be difficult to source the quality (or lack thereof) of results for any label back to a single attributable classifier. Also given that each unique label-set is predefined, this method does not generalize well if there are unseen unique label combinations in the training dataset.

Classifier chains transformation is similar to binary relevance with the exception that it builds a sequence of binary classifiers and the prior label predictions form part of the training input data object for the subsequent classifier. This takes advantage of information in part of the label-set when predicting the balance of the labels. However, the order of the individual label classifiers within a chain can be an important factor on accuracy. That is, the result of a classifier chain can vary for different order of chains. Thus, the sequence of the chain of classifiers may be considered as an optimizable hyperparameter, particularly in training a model comprising classifier chains to maximize the uni-directional information transfer of label-set data. For a relatively small set of labels, this is typically not a problem as one can brute-force grid search over all possible sequence permutations, however as the unique number of labels increases this can soon become very computationally expensive. Accordingly, techniques that improve the overall performance of a chain of classifiers, such as techniques described herein, enable solving of machine learning problems that have large classification label spaces with many correlated relationships. In doing so, the techniques described herein improve accuracy, efficiency, and speed of multi-label classification machine learning models, thus reducing the number of computational operations needed and/or the amount of training data entries needed to multi-label classification machine learning models. Accordingly, the techniques described herein improve at least one of the computational efficiency, storage-wise efficiency, and speed of training multi-label classification machine learning models.

FIG. 4 presents a flowchart diagram of an example process 400 for performing multi-label classification operations on a prediction input data object associated with a label-set comprising a plurality of classifications labels. Via the various steps/operations of the process 400, the predictive data analysis computing entity 106 can use a multi-label classification machine learning model to generate a sequence of classifier groups and use the sequence of classifier groups to generate classification scores for a prediction input data object associated with a plurality of classification labels.

The process 400 begins at step/operation 402 when the predictive data analysis computing entity 106 identifies (e.g., receives) a prediction input data object. The prediction input data object may comprise a prediction set comprising a plurality of classification labels for a collection of data. The collection of data may include features that may be associated with the plurality of classification labels from the prediction set. In some embodiments, the plurality of classification labels characterize the collection of data to which one or more predictive data analysis operations are performed, such as with respect to predicting disease codes or generating a healthcare prediction.

In some embodiments, the prediction input data object describes a prediction of a machine learning model, such as a classifier. The prediction may comprise a prediction set comprising a classification output based on a given data input. A classification output may include one or more classification labels. As an example, in some embodiments, the classification labels may comprise medical codes, e.g., International Statistical Classification of codes, prescription (RX) codes that are generated as classification output for prediction electronic medical records data.

In some embodiments, a classification label describes information labels that associate features, properties, or characteristics to a training input data object, such as images, text files, audio/video files, and application files that may be used to, for example, train a machine learning model. The information labels may comprise descriptions, tags, or identifiers that classify or emphasize features present in training input data object which may be analyzed by machine learning models for patterns to perform a predictive inference. A training input data object may be generated by, for example, a combination of automation software, artificial intelligence, and human input. For example, in some embodiments, training input data objects in the healthcare domain may comprise medical codes, e.g., ICD codes, CPT codes, and RX codes.

An example of a prediction input data object associated with classification labels corresponds to a prediction set comprising a plurality of classification labels associated with medical data in an electronic medical record. Medical data in an electronic medical record may be labeled with a large volume of labels, for example, up to many thousands of labels, including ICD codes, CPT codes, and RX codes. In some embodiments, a prediction input data object may comprise a large classification label space including correlated relationships within its classification labels for generating predictions.

At step/operation 404, the predictive data analysis computing entity 106 generates, based on the prediction input data object, classification scores for the classification labels. In some embodiments, a multi-label classification machine learning model processes the prediction input data object to generate the classification scores for the classification labels. Accordingly, in some embodiments, the multi-label classification machine learning model is characterized by a sequence of classifier groups.

In some embodiments, a classifier describes hyperparameters, and/or defined operations of a machine learning model, where the machine learning model is trained with training input data objects including classifications labels, and the machine learning model is configured to process a prediction input data object to generate a predictive inference. For example, a classifier may generate a predictive inference based on ICD codes associated with a medical visit data record. As another example, a classifier may generate a predictive inference based on CPT codes associated with a medical service data record. As a further example, the classifier may generate a predictive inference based on RX codes associated with a prescription data record.

In some embodiments, a classifier group describes a set of one or more classifiers. Each of the classifiers may be associated with a respective classification label from a given label group. For example, a given classifier group may comprise n independent classifiers corresponding to respective n classification labels of a given label group.

In some embodiments, label groups describe sets of one or more classification labels. For example, the one or more classification labels may be assigned from a label-set comprising a universal set of classification labels to a respective label group. According to one embodiment, the universal set of classification labels may comprise a prediction input data object.

In some embodiments, a sequence of classifier groups describes an ordered series of classifier groups. The sequence of classifier groups may be characterized by a cumulation of predictive inferences generated by each classifier group in the ordered series. For example, an initial classifier group in the sequence of classifier groups may be generated by selecting an initial group of classification labels from a plurality of label groups and building an independent classifier for each label in the initial group of classification labels. In a further example, a subsequent classifier group after the initial classifier group in the sequence of classifier groups may generated by selecting a subsequent group of classification labels from the plurality of label groups and building an independent classifier for each label in the subsequent group of classification labels in addition to using one or more predictive inferences generated by the initial classifier group as a feature set in the subsequent classifier group. The process described for the subsequent classifier group may be repeated for each successive classifier group generated in the sequence of classifier groups. As such, each subsequent classifier group in the ordered series may build upon prior label predictions in the form of a training input data object for the subsequent model.

According to various embodiments of the present disclosure, each individual classifier in the sequence of classifier groups is associated with a given one of a plurality of label groups and utilizes classification labels from all previous label groups associated with all previous classifiers in the sequence in its training input data object.

In some embodiments, the sequence of classifier groups 500 has the architecture depicted in FIG. 5. As depicted in FIG. 5, the sequence of classifier groups 500 comprises a cascading architecture including classifier group 502A, a classifier group 502B, a classifier group 502C, and a classifier group 502D. It is noted that the quantity of classifier groups depicted in FIG. 5, FIG. 6, and as disclosed herewith, are exemplary in nature, and any quantity of classifier groups within a sequence of classifier groups may be generated according to various embodiments of the present disclosure.

The classifier groups 502A through 502D may operate in a cascading fashion such that the training input data object and prediction output of a given classifier is used as additional information for the next classifier in the cascade. That is, the training input data object and prediction output of classifier group 502A is provided as a training input data object to classifier group 502B, classifier group 502C, and classifier group 502D. The training input data object and prediction output of classifier group 502B is provided as a training input data object to classifier group 502C and classifier group 502D. The training input data object and prediction output of classifier group 502C is provided as a training input data object to classifier group 502D.

In some embodiments, classifier group 502A may be created by selecting a first one of a plurality of label groups and training classifiers for labels within the first label group based on corresponding training input data objects for the labels within the first label group independently, i.e., a classifier for each label in the label group. For example, each per-label classifier is associated with a respective classification label from the plurality of label groups and is configured to generate a classification score for the respective classification label. Classifier group 502A may generate a first prediction output. The first prediction output from classifier group 502A in addition with training input data object associated with classifier group 502A form a first supplemental training input data object for classifier group 502B.

In some embodiments, classifier group 502B may be created by selecting a second one of the plurality of label groups and training classifiers for labels within the second label group based on corresponding training input data objects for the labels within the second label group independently, and the first supplemental training input data object associated with classifier group 502A. Classifier group 502B may generate a second prediction output. The second prediction output from classifier group 502B in addition with training input data object associated with classifier group 502B form a second supplemental training input data object for classifier group 502C.

In some embodiments, classifier group 502C may be created by selecting a third one of the plurality of label groups and training classifiers for labels within the third label group based on corresponding training input data objects for the labels within the third label group independently, and the second supplemental training input data object associated with classifier group 502B. Classifier group 502C may generate a third prediction output. The third prediction output from classifier group 502C in addition with training input data object associated with classifier group 502C form a third supplemental training input data object for classifier group 502D.

In some embodiments, classifier group 502D may be created by selecting a fourth one of the plurality of label groups and training classifiers for labels within the fourth label group based on corresponding training input data objects for the labels within the fourth label group independently, and the third supplemental training input data object associated with classifier group 502C. Accordingly, classifier group 502D may generate a fourth prediction output that incorporates prior label predictions from classifier groups 502A through 502C. In some embodiments, training of the classifiers within each label group may be parallelized, greatly reducing the computation time, as each classifier within a label group is not dependent on results from another classifier within the same label group.

An example of transforming a training dataset into a sequence of classifier groups is depicted in FIG. 6. As depicted in FIG. 6, in accordance with some embodiments discussed herein, a training input data object 600 comprises a feature-set 'x' including features x1, x2, x3. A feature may comprise an attribute or characteristic associated with a body of data that may be used for analysis and training of a classifier. The training input data object 600 also comprises a label-set including classification labels y1, y2, y3, y4, y5, y6, and y7. The classification labels may provide a description or identification of an observed feature. According to the illustrated embodiment, binary values are assigned to columns of the classification labels based on whether the features x1, x2, and x3 exhibit properties associated with the classification labels, where a value of '1' may indicate the presence of an observed feature and a value of '0' may indicate no presence of an observed feature.

According to the illustrated embodiment, the seven classification labels may be divided into three label groups (y2, y5, y6), (y1, y3, y4), (y7) for creating sets of individual classifiers. The process for selecting and dividing the classification labels into label groups is further described in subsequent discussions below. A sequence of classifier groups are represented by classifier groups 602A, 602B and 602C. Bolded portions of the classifier groups 602A, 602B and 602C represent training input data object utilized for training and the white portions represent targeted classification labels.

According to various embodiments of the present disclosure, each sequential classifier group forms chains to preserve classification label correlation. For example, classifier group 602A comprises three independent classifiers trained for (y2, y5, y6) based on training input data including x1, x2, x3. Classifier group 602B comprises three independent classifiers trained for (y1, y3, y4) based on training input data including x1, x2, x3 and the prediction output of classifier group 602A. Classifier group 602C comprises one independent classifier trained for (y7) based on training input data including x1, x2, x3 and the prediction output of classifier group 602B.

In some embodiments, a plurality of label groups are generated during training of the multi-label classification machine learning model. Generating the plurality of label groups may comprise selecting and assigning classification labels from a training input data object into label groups. It may be beneficial to assign each label to a label group whereby the inner-group correlation is minimal. As discussed above, the order of classifier groups within a sequence of classifier groups can be an important factor on accuracy and that the result of the sequence of classifier groups can vary for different order of classifier groups. Grouping classification labels into minimally correlated groups may allow for lesser variance and minimal impact on the global accuracy of prediction output generated from a sequence of classifier groups. That is, by distributing highly correlated classification labels into different label groups, loss of information from the correlations, in given sequence combinations of classifier groups within a sequence of classifier groups, is less likely to occur.

In some embodiments, correlation values representative of co-occurrence frequency between a plurality of classification labels are generated. Each correlation value may comprise a co-occurrence frequency measure for a classification label pair as determined based on the training dataset. In some embodiments, correlation values describe a statistical measure of a strength of a relationship between two variables, e.g., co-occurrence frequency. In some embodiments, the relationship may comprise a semantic proximity of the two variables. For example, co-occurrence frequency may comprise an above-chance frequency of phrases associated with two given classification labels coinciding or existing within a structure of text. In some embodiments, co-occurrence frequency measure describes a value corresponding to a measurement of co-occurrence frequency. The measurement of co-occurrence frequency may comprise correlation values that are calculated for a classification label pair.

According to one embodiment, correlation values may comprise a Pearson correlation coefficient between two given classification labels, where a scale from −1 (e.g., perfectly negatively correlated) to +1 (e.g., perfectly positive correlated) may be assigned to given classification label pairs. FIG. 7 depicts an exemplary heatmap 700 of Pearson correlations between classification labels in accordance with some embodiments discussed herein.

In yet another embodiment, a cosine similarity value may be calculated for the correlation values between two given classification labels. Calculating the cosine similarity value may include embedding a label-set associated with a prediction input data object in a lower dimensional context using methods such as "Bag Of Words" (BOW) or skip-gram to produce context vectors for each classification label. A cosine similarity value may be in the range (0, 1) where '1' may imply that two given classification labels co-occur perfectly and '0' may imply they have no relationship.

In a further embodiment, the correlation values may comprise a relative spatial distance between the classification labels. Other examples of correlation values that may be used include Sorensen—Dice coefficients, Hamming distance, Jaccard similarity coefficient, and Kulsinski dissimilarity. Correlation values may be used to generate a plurality of label groups, where each label group includes a grouped subset of the plurality of label groups that are minimally correlated in accordance with the correlation values.

According to one embodiment, a plurality of label groups are generated based on the correlation values. Each of the plurality of label groups may include a grouped subset of the plurality of label groups, where the grouped subset has an inner group correlation measure that satisfies one or more inner group correlation measure conditions. For example, a given group of labels may include one or more classification labels, where each classification label within the given group of labels has a minimal correlation with other ones of classification labels within the given group of labels. Minimal correlation of the classification labels may be determined by generating correlation values representative of co-occurrence frequency or covariance between a plurality of classification labels. The correlation values may comprise a co-occurrence frequency or covariance measure for a classification label pair as determined based on a training dataset.

According to various embodiments of the present disclosure, a given one of a plurality of classification labels is assigned to a given one of g candidate label groups based on a lowest total inner group correlation measure. In some embodiments, an inner group correlation measure describes a correlation value between a classification label within a particular group of labels and another classification label within the same particular group of labels. The total inner group correlation measure may comprise an absolute relative spatial distance between the plurality of labels.

According to another embodiment, classification labels of the label-set may be assigned to each group of labels such that the sum of the absolute sum of correlations within each group is minimized. This may be accomplished by, for example, iteratively assigning a given classification label with a highest total absolute correlation summation measure to all other classification labels to a given one of a plurality of label groups with a resulting lowest inner group correlation measure. This process may be repeat until all classification labels of the label-set have been assigned. In some embodiments, total absolute correlation summation measure describes a summation of correlation values for all labels within a group of labels. According to one embodiment, for each classification label within a label group, a total absolute correlation summation measure is generated based on each correlation value that is associated with the classification label with respect to other classification labels within the same label group.

According to yet another embodiment of the present disclosure, g candidate label groups are generated for the candidate label group count g, where for each classification label, a total absolute correlation summation measure is generated based on each correlation value that is associated with the classification label. The g candidate label groups may comprise at least two candidate label groups, each of the at least two candidate label groups including at least two initially-grouped classification label from the group of classification labels. For each classification label among a sub-group of classification labels that is initially generated by excluding all initially-grouped classification labels starting from the classification label having a highest total absolute correlation summation measure, a candidate label group having a highest total inner group correlation measure may be updated to include the current classification label, and the current classification label may be excluded from the sub-group.

According to another embodiment, generating the g candidate label groups for the candidate label group count g may comprise for each classification label, generating, using a mixed integer linear program machine learning model and based on the correlation values and the candidate label group count g, g group inclusion indicators each associated with one of the g candidate label groups.

In some embodiments, a mixed integer linear program machine learning model describes parameters, hyperparameters, and/or defined operations of a machine learning model that is configured to determine an optimal or desired outcome in a mathematical model where an objective and one or more constraints may be expressed as a system of linear equations. As an example, a mixed integer linear program machine learning model may be configured to group classification labels into a given quantity of label groups with given total inner group correlation measures.

In some embodiments, the mixed integer linear program machine learning model may solve for an optimal solution to minimize the total global absolute correlation of the subgroups. For example, if the number of sub-groups is s and the number of labels is n, the following Equation 1 may be used to determine, where $X_{ij}$ and $X_{ik}$ may be a binary indicator [0, 1] determining whether two given classification labels belong within a particular subgroup to achieve a minimum total inner group correlation measure. $C_{jk}$ may represent a correlation value between two labels and j and k are representative of indexing of the classification labels.

$$\min \sum_{i=1}^{s} \sum_{\substack{j=1 \\ k=1}}^{n} C_{jk} x_{ij} x_{ik} \text{ s.t.} \qquad \text{Equation 1}$$

$$\sum_{i=1}^{s} x_{i(jk)} = 1, \forall\, j, k \in \{1, \ldots, n\}$$

$$C_{jk} = 0, \forall\, j = k$$

According to another embodiment, classification label mapping to label groups may utilize a technique, such as k-means clustering. In particular, the classification label mapping may be based on an inverse K-means clustering. Clustering may be performed on a label-set, creating k number of label clusters. In some embodiments, label clusters describe a technique for grouping classification labels into label groups. For example, k-means clustering may be performed on a label-set, creating k number of label clusters. In one embodiment, the k-means clustering may assign classification labels to labels groups by minimizing an expectation-maximization function. According to an alternative embodiment, the expectation-maximization function is maximized so that the sum of the squared distances is at its most in each label group.

In some embodiments, generating the plurality of label groups comprises for each classification label, generating a classification label mapping in a multi-dimensional clustering space. A defined number of label clusters may be generated based on each classification label mapping and using a clustering machine learning model. The plurality of label groups may be generated based on the defined number of label clusters.

In some embodiments, multi-dimensional clustering space describes a collection of a plurality of elements where each of the plurality of elements may be selected for grouping into element groups. In an example, a label group is generated by generating a mapping of classification labels within a label-set. According to one embodiment, the classification labels may be the mapped based on minimum correlation values among the classification labels.

In some embodiments, generating the plurality of label groups may further comprise determining an optimal number of label groups. A plurality of label groups may comprise G label groups, and G may be generated by selecting an optimal label group count from a label group count range that comprises a plurality of candidate label group counts. The optimal label group count range may be determined based on a trade-off of computing resources and total inner group correlation measure. For example, by setting a fixed upper allowable budget for computation (e.g., X computational units are allowed, then cannot exceed quantity Y label groups).

According to another embodiment, each of the plurality of candidate label group counts may be associated with a total inner group correlation measure for g candidate label groups that are generated by dividing a group of classification labels into g candidate minimally correlated label groups. The optimal label group count is selected by selecting the candidate label group count g that is associated with a largest decline of a group count selection relationship between the plurality of candidate label group counts and corresponding total inner group correlation measures.

In some embodiments, an optimal sequence of label groups for generating a sequence of classifier groups is determined. For example, according to various embodiments of the present disclosure, whilst the impact of the order of the individual labels has been minimized by grouping them into minimally correlated label groups, an optimal sequence of the label groups used in a sequence of classifier groups is still desirable. Determining the optimal sequence of the label groups may be calculated via hyperparameter optimization or any other optimization algorithms known to those of ordinary skill in the art. However, instead of n! computations performed for n classification labels, the amount of computations may be reduced to a number of classifier groups of a sequence of classifier groups.

Returning to FIG. 4, at step/operation 406, the predictive data analysis computing entity 106 performs one or more prediction-based actions based at least in part on the classification scores. In some embodiments, the prediction input data object is a labeled document data object, the prediction output is a document classification/label for the labeled document data object, and the prediction-based actions are performed based at least in part on the classification/label. In some embodiments, performing the one or more prediction-based actions based at least in part on the label assignment for a labeled document data object includes displaying the one or more label assignment for the labeled document data object using a prediction output user interface, such as the prediction output user interface 800 of FIG. 8.

As depicted in FIG. 8, the prediction output user interface 800 displays a list of top related diagnosis code labels for an input labeled document data object. According to some embodiments, the prediction output user interface 800 may be configured to generate automated ICD coding prediction within medical records. In another embodiment, the prediction output user interface 800 may be configured to predict future propensity to a variety of diseases and admissions to various healthcare settings.

As shown in the illustrated embodiment, a I11.0 Hypertensive Heart Disease with Heart Failure code may be aided by positive predictions of other related ICD 10 codes such as I509.9 unspecified heart failure, I13.0 chronic kidney disease, E26.1 secondary hyperaldosteronism, and E11.22 diabetes. Feature weights may also be generated for the correlated ICD codes.

In some embodiments, performing the prediction-based actions include performing load balancing operations for a post-prediction system. For example, various embodiments of the present disclosure make important technical contributions to improving resource-usage efficiency of post-prediction systems by using classifier chains that leverage the co-occurrence or correlations of a label-set to minimize the computational effort of processing on large multi-label label-sets. For example, in some embodiments, a predictive data analysis computing entity determines L per-label classifications for L label groups of a prediction input data object based at least in part on the label-set representation for the L label groups. Then, the count of label groups that are associated with affirmative per-label classifications, along with a resource utilization ratio for each label group, can be used to predict a predicted number of computing entities needed to perform post-prediction processing operations (e.g., automated investigation operations) with respect to the L label groups. For example, in some embodiments, the number of computing entities needed to perform post-prediction processing operations (e.g., automated investigation operations) with respect to the L label groups can be determined based at least in part on the output of the equation:

$$R = \mathrm{ceil}\left(\sum\nolimits_{k}^{k=K} ur_k\right),$$

where R is the predicted number of computing entities needed to perform post-prediction processing operations with respect to the L label groups, ceil(·) is a ceiling function that returns the closest integer that is greater than or equal to the value provided as the input parameter of the ceiling function, k is an index variable that iterates over K label groups among the L label groups that are associated with affirmative investigative classifications, and $ur_k$ is the estimated resource utilization ratio for a kth label group that may be determined based at least in part on a size associated with the kth label group. In some embodiments, once R is generated, the predictive data analysis computing entity can use R to perform operational load balancing for a server system that is configured to perform post-prediction processing operations (e.g., automated investigation operations) with respect to the L label groups. This may be done by allocating computing entities to the post-prediction processing operations if the number of currently-allocated computing entities is below R, and deallocating currently-allocated computing entities if the number of currently-allocated computing entities is above R.

Accordingly, as described above, various embodiments of the present disclosure make important technical contributions to improving computational efficiency of generating multi-label classifications for prediction input data objects that are associated with a large number of predictive labels. A common challenge in machine learning is the ability to perform multi-label prediction on a large volume of classification labels. This is made difficult by the fact that many machine learning systems and techniques are designed for either binary or multi-label classification. Hence in order to solve these problems, typically some type of transformation is required.

Examples of such transformations include binary relevance, label powerset, and classifier chains. Binary relevance may involve creating n individual classifier, one for each label 0, 1, 2, 3, . . . , n, transforming the multi-label problem to multiple binary classification problems. The advantage of this is that it places no limitation on the choice of algorithm, however it fails to take advantage of any information sharing within a label-set as all classifiers are independent. Label powerset includes finding all unique combinations of n labels and categorizes them with a unique alternate label, which converts the problem into a multiclass classifier. The main disadvantage of this method is that as the problem set grows, both independent data and number of labels-sets in the data, the number of assigned labels also grows quite quickly. It can also be difficult to source the quality (or lack thereof) of results for any label back to a single attributable classifier. Also given that each unique label-set is predefined, this method does not generalize well if there are unseen unique label combinations in the dataset.

Classifier chains transformation is similar to binary relevance with the exception that it builds a sequence of binary classifiers and the prior label predictions form part of the training input data object for the subsequent classifier. This takes advantage of information in part of the label-set when predicting the balance of the labels. However, the order of the individual label classifiers within a chain can be an important factor on accuracy. That is, the result of a classifier chain can vary for different order of chains. Thus, the sequence of the chain of classifiers may be considered as an optimizable hyperparameter, particularly in training a model comprising classifier chains to maximize the uni-directional information transfer of label-set data. For a relatively small set of labels, this is typically not a problem as one can brute-force grid search over all possible sequence permutations, however as the unique number of labels increases this can soon become very computationally expensive. Accordingly, techniques that improve the overall performance of a chain of classifiers, such as techniques described herein, enable solving of machine learning problems that have large classification label spaces with many correlated relationships. In doing so, the techniques described herein improve accuracy, efficiency, and speed of multi-label classification machine learning models, thus reducing the number of computational operations needed and/or the amount of training data entries needed to multi-label classification machine learning models. Accordingly, the techniques described herein improve at least one of the computational efficiency, storage-wise efficiency, and speed of training multi-label classification machine learning models.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method comprising:
generating, by one or more processors and during a machine learning model training process, a plurality of label groups by:
(i) generating a plurality of correlation values based on a training dataset and a plurality of training classification labels,
(ii) generating a plurality of candidate label groups of different group count ranges based on a total inner group correlation measure,
(iii) determining an optimal label group count from a plurality of candidate label group counts by minimizing (a) a quantity of label groups and (b) the total inner group correlation measure,
(iv) generating, based on the optimal label group count, the plurality of label groups, wherein (a) a label group of the plurality of label groups includes a grouped subset of the plurality of label groups and (b) the grouped subset comprises an inner group correlation measure that satisfies an inner group correlation measure condition, and (v) generating, using a hyperparameter optimization algorithm, an optimal sequence of the plurality of label groups;

receiving, by the one or more processors, a prediction input data object associated with a plurality of classification labels assigned to the plurality of label groups;

inputting, by the one or more processors, the prediction input data object to a multi-label classification machine learning model to receive a plurality of classification scores corresponding to the plurality of classification labels; and initiating, by the one or more processors, one or more prediction-based actions based on the plurality of classification scores.

2. The computer-implemented method of claim 1, wherein:

determining the optimal label group count comprises determining a candidate label group count g of the plurality of candidate label group counts that is associated with a largest decline of a group count selection relationship between the plurality of candidate label group counts and corresponding total inner group correlation measures.

3. The computer-implemented method of claim 2, wherein generating the plurality of candidate label groups for the candidate label group count g comprises:

generating, using a mixed integer linear program machine learning model and based on the plurality of correlation values and the candidate label group count g, g group inclusion indicators corresponding to the plurality of candidate label groups.

4. The computer-implemented method of claim 2, wherein generating the plurality of candidate label groups comprises:

generating a total absolute correlation summation measure based on one or more correlation values associated with a training classification label of the plurality of training classification labels;

generating the plurality of candidate label groups comprising at least two candidate label groups, the at least two candidate label groups including at least two initially-grouped classification labels from the plurality of training classification labels;

updating a candidate label group having a highest total inner group correlation measure to include a current classification label among a subgroup of the plurality of training classification labels that is initially generated by excluding all initially-grouped classification labels starting from the training classification label having a highest total absolute correlation summation measure, and excluding the current classification label from the subgroup.

5. The computer-implemented method of claim 4, wherein generating the plurality of label groups comprises:

generating a plurality of classification label mappings corresponding to the plurality of training classification labels in a multi-dimensional clustering space;

generating, based on the plurality of classification label mappings and using a clustering machine learning model, a defined number of label clusters; and generating the plurality of label groups based on the defined number of label clusters.

6. The computer-implemented method of claim 5, wherein a classification label mapping of the plurality of classification label mappings comprises one or more correlation values associated with the training classification label.

7. The computer-implemented method of claim 2 wherein the total inner group correlation measure comprises an absolute relative spatial distance between the plurality of training classification labels.

8. The computer-implemented method of claim 1 further comprising assigning a given one of the plurality of training classification labels to a given one of the plurality of candidate label groups based on a lowest total inner group correlation measure.

9. The computer-implemented method of claim 1 wherein a per-label classifier of a plurality of preceding per-label classifier sets is associated with a respective label from the plurality of label groups and is configured to generate a classification score for the respective label.

10. The computer-implemented method of claim 6, wherein generating the classification label mapping further comprises generating the classification label mapping based on an inverse K-means clustering.

11. The computer-implemented method of claim 1, wherein a training classification label is associated with one of a plurality of predefined label groups.

12. The computer-implemented method of claim 1, wherein:

(i) the multi-label classification machine learning model comprises a sequence of classifier groups ordered according to the optimal sequence and comprising an initial classifier group and a plurality of non-initial classifier groups, (ii) the initial classifier group comprises an initial per-label classifier set associated with an initial label group of the plurality of label groups, and (iii) a non-initial classifier group of the plurality of non-initial classifier groups comprises a subsequent per-label classifier set associated with a subsequent label group, subsequent to the initial classifier group, of the plurality of label groups and a plurality of preceding per-label classifier sets from a plurality of preceding classifier groups, including the initial label group, in the sequence of classifier groups.

13. A system comprising:

one or more processors; and at least one memory storing processor-executable instructions that, when executed by the one or more processors, cause the one or more processors to:

generate, during a machine learning model training process, a plurality of label groups by:

(i) generating a plurality of correlation values based on a training dataset and a plurality of training classification labels, (ii) generating a plurality of candidate label groups of different group count ranges based on a total inner group correlation measure, (iii) determining an optimal label group count from a plurality of candidate label group counts by minimizing (a) a quantity of label groups and (b) the total inner group correlation measure, (iv) generating, based on the optimal label group count, the plurality of label groups, wherein (a) a label group of the plurality of label groups includes a grouped subset of the plurality of label groups and (b) the grouped subset comprises an inner group correlation measure that satisfies an inner group correlation measure condition, and (v) generating, using a hyperparameter optimization algorithm, an optimal sequence of the plurality of label groups;

receive a prediction input data object associated with a plurality of classification labels assigned to the plurality of label groups;

input the prediction input data object to a multi-label classification machine learning model to receive a plurality of classification scores corresponding to the plurality of classification labels;

initiate one or more prediction-based actions based on the plurality of classification scores.

14. The system of claim 13, wherein:

determining the optimal label group count comprises determining a candidate label group count g of the plurality of candidate label group counts that is associated with a largest decline of a group count selection relationship between the plurality of candidate label group counts and corresponding total inner group correlation measures.

15. The system of claim 14, wherein generating the plurality of candidate label groups for the candidate label group count g comprises:

generating, using a mixed integer linear program machine learning model and based on the plurality of correlation values and the candidate label group count g, g group inclusion indicators corresponding to the plurality of candidate label groups.

16. The system of claim 13, wherein generating the plurality of candidate label groups comprises:

generating a total absolute correlation summation measure based on one or more correlation values associated with a training classification label of the plurality of training classification labels;

generating the plurality of candidate label groups comprising at least two candidate label groups, the at least two candidate label groups including at least two initially-grouped classification labels from the plurality of training classification labels;

updating a candidate label group having a highest total inner group correlation measure to include a current classification label among a subgroup of the plurality of training classification labels that is initially generated by excluding all initially-grouped classification labels starting from the training classification label having a highest total absolute correlation summation measure, and excluding the current classification label from the subgroup.

17. The system of claim 13, wherein the total inner group correlation measure comprises an absolute relative spatial distance between the plurality of training classification labels.

18. The system of claim 13 wherein the one or more processors are further caused to:

assign a given one of the plurality of training classification labels to a given one of the plurality of candidate label groups based on a lowest total inner group correlation measure.

19. The system of claim 13, wherein generating the plurality of label groups comprises:

generating a plurality of classification label mappings corresponding to the plurality of training classification labels in a multi-dimensional clustering space;

generating, based on the plurality of classification label mappings and using a clustering machine learning model, a defined number of label clusters; and generating the plurality of label groups based on the defined number of label clusters.

20. One or more non-transitory computer-readable storage media including instructions that, when executed by one or more processors, cause the one or more processors to:

generate, during a machine learning model training process, a plurality of label groups by:

(i) generating a plurality of correlation values based on a training dataset and a plurality of training classification labels, (ii) generating a plurality of candidate label groups of different group count ranges based on a total inner group correlation measure, (iii) determining an optimal label group count from a plurality of candidate label group counts by minimizing (a) a quantity of label groups and (b) the total inner group correlation measure, (iv) generating, based on the optimal label group count, the plurality of label groups, wherein (a) a label group of the plurality of label groups includes a grouped subset of the plurality of label groups and (b) the grouped subset comprises an inner group correlation measure that satisfies an inner group correlation measure condition, and (v) generating, using a hyperparameter optimization algorithm, an optimal sequence of the plurality of label groups;

receive a prediction input data object associated with a plurality of classification labels assigned to the plurality of label groups;

input the prediction input data object to a multi-label classification machine learning model to receive a plurality of classification scores corresponding to the plurality of classification labels;

initiate one or more prediction-based actions based on the plurality of classification scores.

* * * * *